(12) United States Patent
Aktas

(10) Patent No.: US 6,438,216 B1
(45) Date of Patent: Aug. 20, 2002

(54) NONINTRUSIVE CALL NOTIFICATION METHOD AND SYSTEM USING CONTENT-SPECIFIC INFORMATION

(75) Inventor: Christoph Aktas, Sunnyvale, CA (US)

(73) Assignee: Siemens Information and Communication Networks, Inc., Boca Raton, FL (US)

(*) Notice: Subject to any disclaimer, the term of this patent is extended or adjusted under 35 U.S.C. 154(b) by 0 days.

(21) Appl. No.: 09/126,313

(22) Filed: Jul. 30, 1998

(51) Int. Cl.[7] .................................................. H04M 3/42
(52) U.S. Cl. ............................. 379/88.01; 379/88.14; 379/142.08; 379/215.01
(58) Field of Search ........................... 379/67.1, 88.01, 379/88.11, 88.12, 88.13, 88.14, 88.19, 88.2, 88.21, 88.22, 93.15, 93.17, 142.08, 215.01, 202.01; 704/270; 348/14.08, 14.09, 14.1; 370/260, 261; 709/204

(56) References Cited

U.S. PATENT DOCUMENTS

| | | | |
|---|---|---|---|
| 5,228,073 A | | 7/1993 | Smith ........................... 379/57 |
| 5,263,084 A | | 11/1993 | Chaput et al. ............... 379/215 |
| 5,493,692 A | * | 2/1996 | Theimer et al. ............ 455/26.1 |
| 5,511,111 A | * | 4/1996 | Serbetcioglu et al. ....... 379/67.1 |
| 5,661,783 A | | 8/1997 | Assis ............................ 379/67 |
| 5,724,412 A | | 3/1998 | Srinivasan ................ 379/93.23 |
| 5,805,677 A | * | 9/1998 | Ferry et al. ............... 379/93.35 |
| 5,894,504 A | * | 4/1999 | Alfred et al. ............. 379/88.13 |
| 6,041,103 A | * | 3/2000 | La Porta et al. ............ 379/67.1 |

* cited by examiner

Primary Examiner—Scott L. Weaver

(57) ABSTRACT

A method and system for enabling call notification for a user of a telephonic device, such as a telephone, computer or video conference system, include forming a notification message having content-specific information relating to the subject matter of interest to the calling party. Preferably, the notification message also includes caller identification. In one embodiment, the application of the method is restricted to call-waiting circumstances, but this is not critical. The content-specific information is acquired using automated processes, such as interactive voice recognition. Voice responses are converted to a proper text format for presentation on a display of the target telephonic device. The display of the notification message presents the content-specific information in a nonintrusive manner. The called party is thereby able to form an informed decision as to whether to answer the incoming call, interrupt an ongoing call, or forward the call and/or the notification message to a mailbox.

18 Claims, 4 Drawing Sheets

NONINTRUSIVE CALL NOTIFICATION METHOD AND SYSTEM USING CONTENT-SPECIFIC INFORMATION

BACKGROUND OF THE INVENTION

The invention relates generally to methods and systems for providing call notification and more particularly to methods and systems for presenting a called party with information regarding an incoming audio and/or video telephone call.

DESCRIPTION OF THE RELATED ART

The ability to identify the source of an incoming telephone call allows a called party to have greater control over the handling of calls. Depending upon the sources of incoming calls, the called party may immediately answer time-sensitive calls, allow other calls to be transferred to a voicemail system, and leave calls from solicitors unanswered.

Services for identifying numbers or individuals are available from telecommunications providers. One technique is to use Automatic Number Identification (ANI), which passes the telephone number of a calling party through a public switched telephone network (PSTN). The information may be directly presented to the called party on the display of a display phone or may be used to access a database of previously acquired additional information regarding calling parties.

A similar service is referred to as caller identification, which provides a data stream indicative of the number of the calling telephone and of the name of the calling party. The information can then be presented to a called party using the display of a feature phone or a monitor of a computer having telephone capability.

Another approach is described in U.S. Pat. No. 5,724,412 to Srinivasan. The patent describes a method and system for providing a telephony subscriber with Internet information related to a caller attempting to contact the subscriber. The Internet information may be the identification of the caller and the addressing data for use in establishing Internet connectivity. The information is provided to the equipment of the called subscriber during the first and second rings of an incoming call. If the called subscriber elects not to answer the call or is not present during the incoming call, the Internet information may be stored for later access. For example, the Internet information may be stored with a voicemail message. The Internet information may be presented to the subscriber in one or more of different formats, e.g., all text, all vocalized in speech, or a combination of text and vocalized speech.

Within a business environment, a person may be designated to forward incoming calls to one or more persons. If a called person is engaged in an on-going call or a video conference, it is difficult to inform the called person of an important incoming call in a nonintrusive manner. Call waiting is one option, as described in U.S. Pat. No. 5,263,084 to Chaput et al. A called party who is engaged in a telephone conversation when a second incoming call is received will be notified with a call-waiting tone, typically a 440 Hz tone. The called party then has the option of temporarily suspending the original call to determine whether the second incoming call is sufficiently important to justify terminating the original call.

A less intrusive approach is described in U.S. Pat. No. 5,228,073 to Smith. A receptionist at a reception unit interviews a calling party to determine an appropriate message to be passed onto a called party. For example, the message may simply be that the incoming call is considered "urgent" by the calling party. The receptionist uses a keyboard or other input device to pass the message to a display at the location of the called party. The called party can then determine whether to handle the incoming call.

A service that is available with some mobile phone systems is referred to as a "whispering." If a subscriber to this service is a target of a second incoming call, the subscriber receives a low volume message that alerts the subscriber of the call. The message may include the name of the calling party.

What is needed is a method and system of providing a called party with a nonintrusive notification message having a sufficient content to enable an informed decision regarding handling the call.

SUMMARY OF THE INVENTION

A method and system of providing call notification for a user of a telephonic device that is a target of an incoming call includes utilizing automated processing to acquire and visually display information specific to subject matter of interest to a calling individual. The user is then enabled to answer the incoming call, interrupt an on-going call, or forward the information to a mailbox. Preferably, the information is forwarded as a notification message that includes the content-specific information relating to the subject matter of interest.

In one embodiment, the automated method is restricted to providing an enhanced call-waiting capability. Rather than merely receiving an audio notification that an incoming call has been detected, the called party is notified of the subject matter of interest of the caller. The visual display is more informative and less intrusive than conventional call-waiting techniques. However, in the preferred embodiment, the method is not restricted to use in call-waiting circumstances.

A preferred approach to acquiring the content-specific information is to utilize interactive voice recognition (IVR) techniques to interrogate a calling party. An IVR device solicits voice responses that are converted (using speech-to-text conversion techniques) to a proper format for presentation on the display of the telephonic device that is the target of the incoming call. For example, the display may be a liquid crystal display (LCD) of a feature phone or may be a computer monitor of a computer having telephonic capability.

In another embodiment, the content-specific information is generated by the calling party and sent as a text message. For example, the calling party may generate the text message using a computer keyboard and transmit the text message upon connection with telephone switching circuitry at the target telephonic device. The switching circuitry may be contained within the telephonic device or may be a communications server of a private branch exchange (PBX) or local area network (LAN) that supports a number of telephonic devices. When the text message is received from the calling telephonic device, the content-specific message is displayed at the target telephonic device. In an ISDN environment, the text message may be transmitted via the D-channel.

The method may be used in multimedia applications. For example, the target telephonic device may be a video conferencing system. If the called party is engaged in a video conference, the content-specific notification message regarding an incoming call may be visually displayed at the previously engaged video conferencing system without any interruption or disturbance of the on-going conversation.

Preferably, if the call is not connected to the target telephonic device, the content-specific notification message is stored for subsequent retrieval by the called party. This ensures that the called party is made aware of the call, even when the caller does not elect to leave a voice message in a voicemail system.

DETAILED DESCRIPTION

Figure 1:
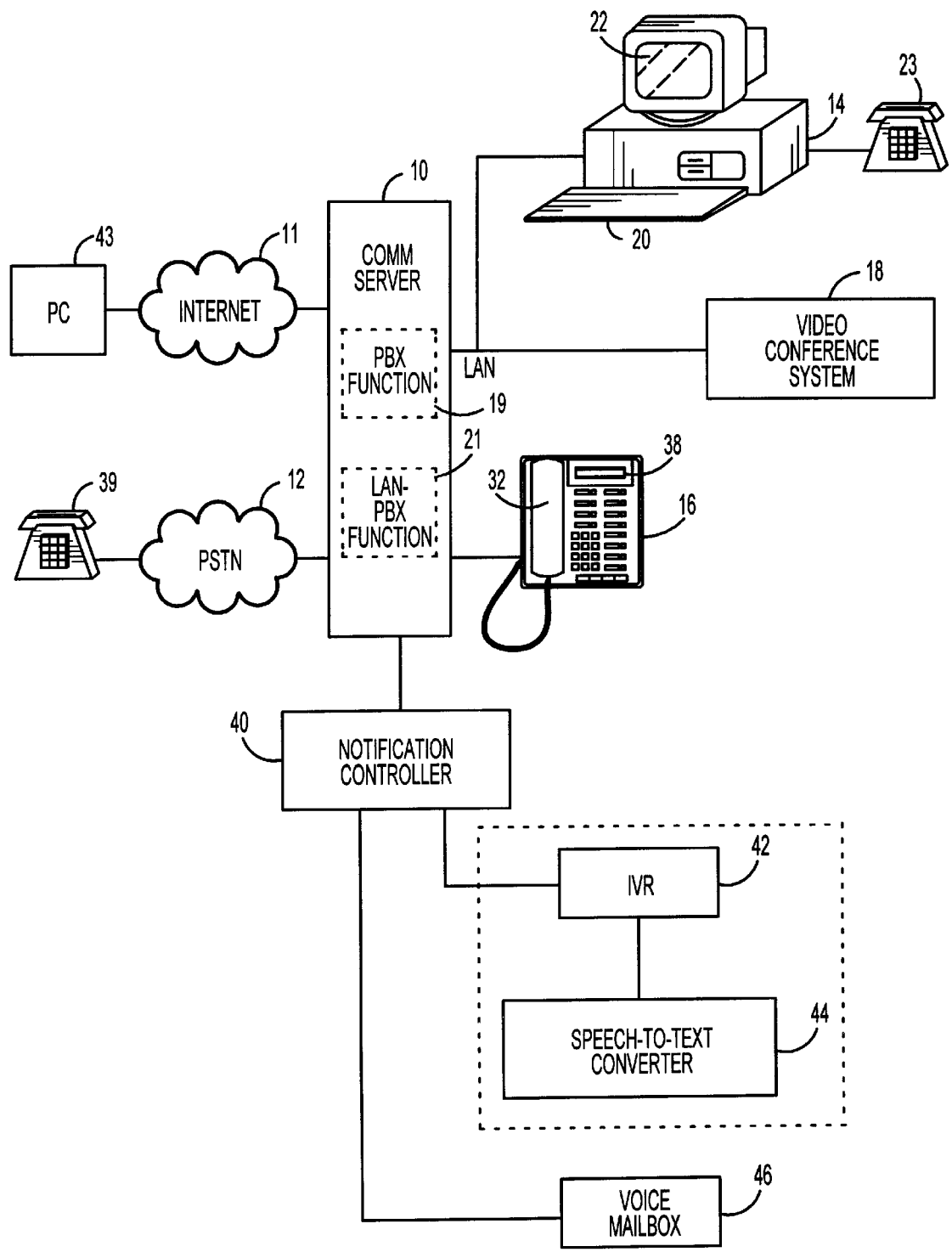
FIG. 1 is a block diagram of one embodiment of a system for providing automated call notification in accordance with the invention.

With reference to FIG. 1, a communications server 10 is shown as being connected to a public switched telephone network (PSTN) 12 and the Internet 11 for supporting communications to a number of telephonic devices. The telephonic devices may include a telephony-enabled computer 14, a feature phone 16, and a video conference system 18. The communications server 10 may provide a PBX function 19 or a LAN function 21 without diverging from the invention. In either embodiment, the server is a conventional communications server that has been upgraded to provide the call notification capability. In a third alternative, the call notification capability is internally enabled at the individual devices 14, 16 and 18, rather than being supported on a system-wide basis. For example, add-on hardware and/or computer software may be used to enable the call notification capability.

The computer 14 may include an adjunct telephone 23 that is employed by a user to engage in an incoming or outgoing telephone call via the communications server 10. Alternatively, the resources of the computer may be utilized. As is known in the art, a sound card can drive a microphone and a speaker during a telephone call. In addition to the exchange of voice data, text data may be input by means of a keyboard 20 and displayed by means of a monitor 22. The monitor is used to present the call notification messages to be described below.

The video conference system 18 includes conventional components, such as a monitor, a camera, speakers and a microphone. Again, the monitor is used to present the call notification messages to be described below. The components of the system 18 are not critical to the implementation of the call notification method.

Figure 2:
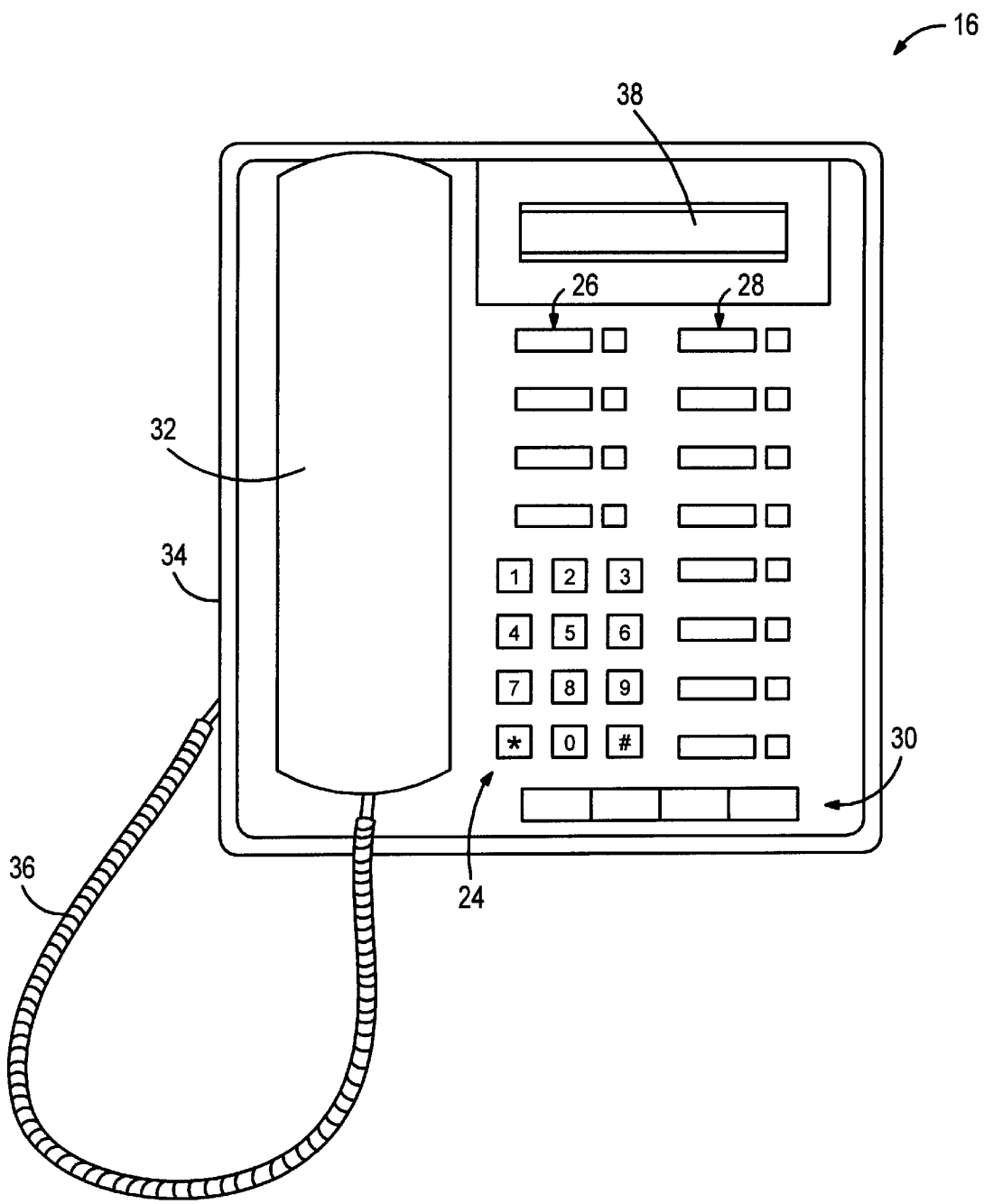
FIG. 2 is a top view of a telephone having a display for visually displaying content-specific information in accordance with the invention.

The faceplate of the feature phone 16 is shown in FIG. 2. The telephone is preferably a digital device, but analog phones may be used. The phone includes a keypad 24 with twelve keys. Depressing a key generates a dual tone multi-frequency (DTMF) tone using conventional circuitry. The phone includes a first column 26 of four feature keys and a second column 28 of eight feature keys. A keymap is stored at the PSTN 12 and represents a correlation between specific feature keys and call service features available to the user of the phone 16. The phone also includes an array 30 of buttons that can be used for such purposes as increasing and decreasing volume.

The feature phone 16 includes a handset 32 connected to a base 34 by a coiled handset cord 36. An important component of the phone is a display 38. The display may be a liquid crystal display (LCD), but other techniques for providing a visual display of text information may be used. If the feature phone is an ISDN device, the text that is presented to a user of the phone is received over the D-channel in the form of display information elements (DIE). In addition to text data from an external source, such as another feature phone, the display 38 may be used to present internally generated text data.

Returning to FIG. 1, the method and system of providing call notification include detecting the target of an incoming call to the communications server 10. A notification message is then displayed at the target telephonic device, such as the telephony-enabled computer 14, the phone 16 or the video conference system 18. The notification message may include the information that is conventional to caller identification applications. That is, the notification message may include one or both of the phone number of the calling telephonic device and the name of the calling individual. The telephone number may be identified using Automatic Number Identification (ANI). The name of the calling party may be determined by accessing a database stored at the location of the communications server 10 to match an ANI-determined number to a person's name. Alternatively, the telephone number of a calling telephone 39 and the caller's name may be provided from the PSTN 12 in a data stream that is conventional to caller identification service. In like manner, the Internet Protocol (IP) address of a calling computer having an attached phone or a call-enabled computer 43 may be acquired via the Internet 11.

In addition to the caller identification information, the notification message includes content-specific information that is acquired using equipment connected to the communications server 10 or is generated by the calling party. For example, the call-enabled computer 43 may include a dialer client that enables entering of a message before connection of the computer 43 to the communications server. The content-specific information is indicative of subject matter of interest to the calling party. The subject matter may be of a business nature or may be personal. The notification message is formatted for visual display at the target telephonic device. In FIG. 1, the monitor 22 of the computer 14 and the monitor of the video conference system 18 are used to provide the visual display of the notification message. If the feature phone 16 is the target device, the notification message is presented by means of the display 38.

In the embodiment of FIG. 1, the notification message is generated using a notification controller 40. The notification controller may be software-based or may be a combination of hardware and software. The notification controller is activated upon detection of an incoming call. The call is picked up by the controller according to configurable conditions. For example, the pickup may occur after a preset number of rings if the target device 14, 16 or 18 rings unanswered (e.g., four rings), but may be set to occur after fewer rings if the target device is busy (e.g., two rings). The notification controller also manages the formatting and transmission of the information to be displayed at the video conference system 18, display phone 16 or computer 14.

The content-specific information regarding the intended subject matter for a conversation between the calling and called parties may be acquired using an interactive voice recognition (IVR) device 42. However, other techniques may be used, as will be described below. The IVR device solicits voice responses from the calling party. For example, if caller identification techniques are not available, the first question may be, "Who may I say is calling?" Following a response by a caller, the second question may be, "What is the intended subject matter of the call?" Following the second response, a third question may be asked of the caller.

The caller responses are converted to a text format using a speech-to-text converter 44. The converter preferably has a large vocabulary that enables recognition of a wide range of topics for the intended conversation. If the converter 44 is unable to recognize the subject matter, the IVR 42 may be programmed to rephrase a question to a caller in order to clarify the description of the intended subject matter. Moreover, in order to confirm that the message has been properly received, the IVR device may rephrase a question and compare responses or may present the received message to the caller with instructions to confirm that the message is correct.

The speech-to-text converter 44 places the notification message in a format that is compatible with display at the intended target telephonic device 14, 16 or 18. The format may be different for different target devices. However, in the preferred embodiment, the format is universal (i.e., ASCII format), thereby simplifying the operations of the IVR 42 and converter 44.

IVR techniques are conventionally used to determine a target telephonic device of an incoming call. For example, in an automatic call distribution (ACD) system, an IVR device is used to solicit responses that aid in selecting an appropriate person to answer a call. Thus, the IVR device may be used to determine whether a sales person or a product support person is needed to handle an incoming call. In comparison to the conventional operation, the IVR device 42 of FIG. 1 is used only after the intended target of an incoming call has been ascertained. For example, when an incoming video conference call is detected at the communications server 10, it is known that the video system 18 is the target, but the IVR device is used to obtain information to be presented to the user of the video system.

The components for providing the notification also include a mailbox 46. If an incoming call is not completed to the target telephonic device after presentation of the notification message, the message may be stored in the appropriate mailbox 46 for later retrieval. In some applications, the called telephonic device may include an internal mailbox. For example, the computer 14 may include dedicated memory for storing notification messages. Thus, there is a history of messages to inform a called party of each prior call, even if a voicemail message is not left by the calling party. That is, the notification message is recorded to provide evidence of an intended call when the calling party leaves no other evidence. This provides the called party with an opportunity to initiate a callback, if the subject matter is of interest to the called party.

Other techniques for interrogating a caller may be utilized. In another embodiment, the notification message is received directly from the calling telephonic device. For example, if the calling device is the computer 14, the keyboard 20 may be used to input a notification message that includes the content-specific information. The notification message may then be transmitted to the target telephonic device for display. In an ISDN environment, the notification message may be sent along the D-channel, or may be sent as a user message that is identified as a content-specific notification message by means of computer programming at the target telephonic device.

Figure 3:
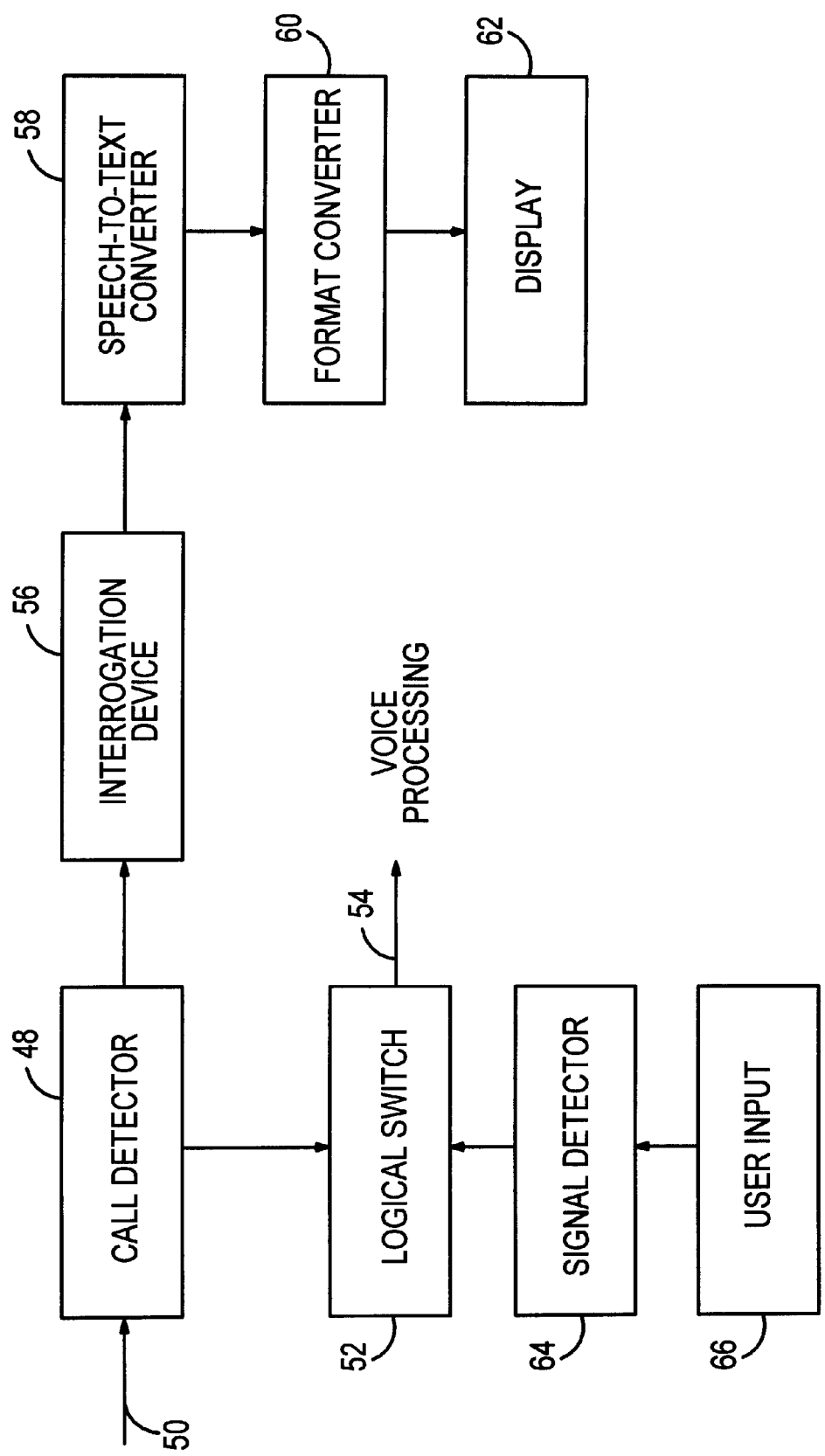
FIG. 3 is a block diagram of components for a single-device implementation of the invention.

FIG. 3 illustrates components of a single-device implementation of the invention, with the device having internal capability of implementing the call notification method. That is, a notification system is provided within a single telephonic device, such as a computer, a feature phone, or a video conference system. The components include a call detector 48 connected to a communications line 50, such as an analog or digital telephone line. The condition of a logical switch 52 determines whether the telephonic device is immediately available to receive an incoming call. Immediate availability may be based on whether the telephonic device is presently engaged in a call or may be based on settings provided by the user (e.g., the user sets the device into a Do Not Disturb (DND) mode or sets the device into a mode that automatically triggers the call notification method for each incoming call). An input/output line 54 connects voice processing circuitry to a call when the switch 52 is in the condition that indicates that the device is available and the call is picked up.

When a second incoming call is detected while the logical switch 52 is in the condition that indicates that the target device is not immediately available to receive an incoming call, an interrogation device 56 may be utilized to acquire the content-specific information regarding the intended subject matter of the second caller. The interrogation device may be an IVR device of the type described above. Alternatively, the interrogation device may be a circuit for detecting a notification message that was transmitted by the caller. This caller-generated notification message may be submitted as a response to a request from the interrogation device 56. The request may be transmitted to the calling telephonic device as an audio message for conversion by a speech-to-text converter 58 or as a display signal for display to the caller.

If the content-specific information for forming a notification message is received as voice data, the system includes a speech-to-text converter 58. The first converter outputs a text-based notification message that is formatted by a second converter 60 to an appropriate format (e.g., ASCII format) for visual presentation at a display 62.

In the operation of the circuitry of FIG. 3, a first incoming or outgoing call will result in the switch 52 being placed in the condition for allowing a user to engage in a telephone call. If an incoming call is detected by the call detector 48 during the busy condition (or any other condition that establishes unavailability to immediately receive the incoming call), the interrogation device 56 is used to acquire content-specific information regarding the subject matter of interest to the caller. Any voice responses from the caller are converted to a text format by the converter 58, and a notification message is formatted by the converter 60 for presentation at the display 62. A signal detector 64 is used to monitor the system for a signal from a user input 66 to determine if the called party wishes to connect to the incoming call. If the telephonic device is a computer, the user input may be a designated keystroke. On the other hand, if the telephonic device is a feature phone, the signal that is monitored by the detector 64 may be a flash hook from the switch 52, as is conventional in call-waiting applications. A call that is not connected to the user may be directed to a voice mailbox, not shown. Moreover, the displayed notification message may be stored in memory for later retrieval by the user.

Figure 4:
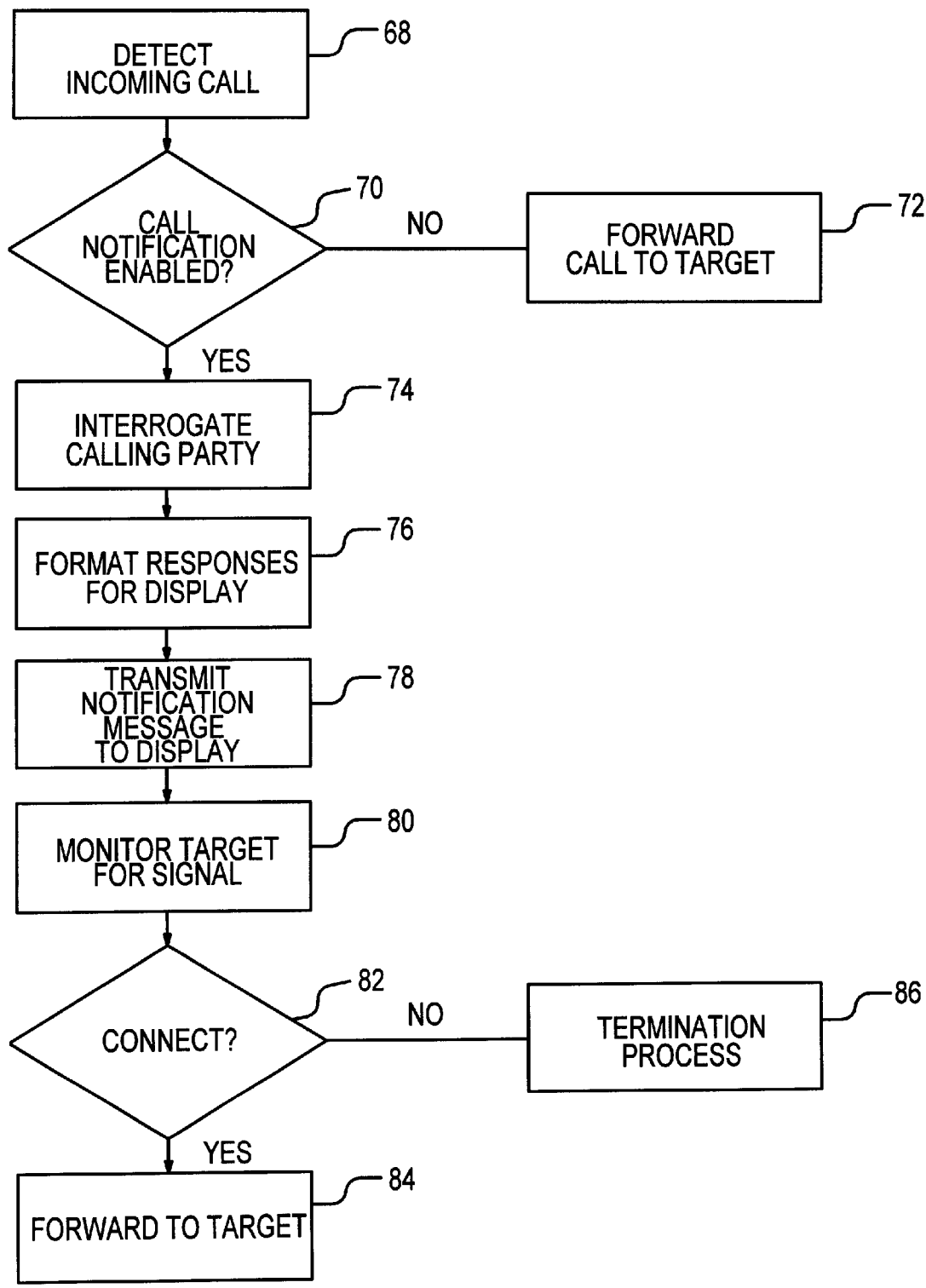
FIG. 4 is a process flow of steps for implementing the automated call notification method of the invention.

The process steps of FIG. 4 apply to the system-wide notification embodiment of FIG. 1 and the single-device notification embodiment of FIG. 3. In step 68, an incoming call is detected. Decision step 70 determines whether call notification is enabled. For example, if the call notification is configured to be used only when the target device (e.g., the video conference system 18) is in a busy condition, the determination at step 70 will be a negative response when the target device is in an available condition. That is, if the process is restricted to call-waiting applications, the call notification is not enabled unless the target device is presently engaged in a call. On the other hand, if the call notification is enabled for all incoming calls, the decision step 70 is unnecessary. A negative response at the decision step results in a forwarding of the call to the target telephonic device at step 72.

An affirmative response at decision step 70, or deletion of step 70 if the notification process is enabled for all incoming calls, results in the interrogation step 74. In the preferred embodiment, the interrogation sequence leads to voice responses from the caller, but other techniques may be used to acquire content-specific information regarding the intended subject matter of the call. One such alternative is to request a user-generated text message from the caller.

The content-specific information is properly formatted at step 76 into a format that is compatible with the display mechanism of the target telephonic device. If the target device is the video conference system 18, the information should be formatted for display at the system. The formatted notification message is transmitted to the display at step 78. The process then switches to a monitoring step 80 for detecting a signal from the target device. If the call is from a solicitor, the signal may be one that indicates that the called party prefers not to receive or return the call. Thus, there may be a designated key that is depressed to generate a signal that the incoming call should be allowed to "ring through" without connection to a voice mailbox. On the other hand, the signal of interest in step 80 may be a hook flash that indicates that the incoming call should be forwarded for connection to the target device. In decision step 82, the hook flash is an affirmative response that results in the forwarding at step 84. As a third alternative, a designated signal or a lack of a signal within a predetermined period of time is a negative response at decision step 82 and a termination process is executed at step 86.

The termination process of step 86 may include a request as to whether the caller wishes to leave a voicemail message. If so, the call is forwarded to a voicemail system before the call is disconnected. In addition, the notification message is stored in a mailbox for later retrieval by the party. Preferably, the notification message is stored even if a voicemail message is recorded. The notification message may be stored along with the name and caller identification as a meta message.

An advantage of the invention is that a called party is provided with sufficient information to enable an informed decision as to whether to connect to an incoming call. This may be particularly advantageous in call-waiting applications. The calling party may have a standard desktop phone, without a display. However, there is a requirement that the called device include an integral or adjacent display.

What is claimed is:

1. A method of providing call notification comprising steps of:

detecting an incoming call directed to a user of a target telephonic device;

utilizing automated processing to acquire information specific to intended subject matter of a conversation upon connection of said incoming call to said target telephonic device, such that content-specific information is acquired, including electronically converting said content-specific information from a first format to a second format, wherein said second format is compatible with a display capability of said target telephonic device, said first format and said second format being different formats, said step of utilizing automated processing including employing interactive voice recognition techniques for interrogating a calling party, including presenting a plurality of separate communications for soliciting a plurality of corresponding responses from said calling party, each of said responses being made in reply to a corresponding said communication;

visually displaying said content-specific information using said display capability of said target telephonic device; and monitoring said target telephonic device for a signal to connect said incoming call to said target telephonic device.

2. The method of claim 1 wherein said step of acquiring content-specific information is implemented as a response to a step of determining that said target telephonic device is engaged in an on-going call.

3. The method of claim 1 further comprising a step of storing said content-specific information along with calling party information in memory as a response to not detecting said signal within a preset period of time.

4. The method of claim 1 wherein said step of utilizing automated processing includes acquiring said content-specific information as voice information.

5. The method of claim 4 wherein said step of utilizing automated processing includes employing speech-to-text conversion techniques to convert said voice information from a calling party to textual content-specific information formatted for compatibility with said display capability.

6. The method of claim 1 further comprising a step of visually displaying caller identification information generally simultaneously with said content-specific information, said caller identification information being indicative of a calling telephonic device.

7. The method of claim 1 wherein said step of detecting said incoming call includes recognizing an incoming video call to a video conferencing system.

8. The method of claim 1 wherein said step of visually displaying said content-specific information includes utilizing an idle telephone line when said target telephonic device is engaged in a telephone call on a first telephone line.

9. An automated method of providing call notification comprising steps of:

detecting unavailability of a target communication device to receive an incoming call;

using automated electronic techniques for interrogating a calling communication device, including interactively acquiring multiple voice responses from a calling party to determine information relating to subject matter of interest to said calling party at said calling communication device, at least a portion of said information being information other than caller identification and being received as speech responses, said automated electronic techniques being implemented within said target communication device;

displaying said information on a display of said target communication device, thereby enabling a called party at said target communication device to identify said subject matter of interest;

enabling said target communication device to accommodate receiving said incoming call; and storing said information for retrieval if said target communication device does not receive said incoming call.

10. The method of claim 9 wherein said step of displaying said information includes converting said speech responses from said calling party to a text format compatible with said display of said target communication device.

11. The method of claim 10 wherein said step of detecting said unavailability includes identifying an unavailable condition of said target communication device, said target communication device being a video conference system, a telephone or a personal computer equipped with telephony capabilities.

12. The method of claim 11 wherein said step of displaying said information is executed while said target communication device remains in said unavailable condition.

13. An automated system for providing call notification comprising:

a communications server for detecting an incoming call directed to a target telephonic device having a display;

automated interrogation means for acquiring content-specific information relating to subject matter of interest to a caller of said incoming call, said content-specific information being attained from said caller as responses to answering a predetermined sequence of questions, at least a portion of said content-specific information being information other than call identification;

means, in communication with said display, for converting said content-specific information of said caller from a non-text format to a text format compatible with said display of said target telephonic device and for transmitting said text formatted content-specific information to said display; and means for coupling said incoming call to said target telephonic device in response to a signal from said target telephonic device, said signal being subsequent to said transmission of said text formatted content-specific information to said display and being indicative of an availability to receive said incoming call.

14. The system of claim 13 wherein said interrogation means has an idle state and an active state, said interrogation means being switched from said idle state to said active state only upon detection that said target telephonic device is in an unavailable condition when said incoming call is received at said communications server.

15. The system of claim 13 wherein said interrogation means includes an interactive voice recognition device that is responsive to caller responses in a voice data format.

16. The system of claim 15 wherein said means for converting includes a speech-to-text converter connected to said interactive voice recognition device to convert said caller responses to said text format.

17. The system of claim 13 wherein said communications server is connected for supporting a plurality of telephonic devices, including a video conference system.

18. A method of providing call notification comprising steps of:

detecting an incoming call directed to a user of a target telephonic device;

utilizing automated processing to acquire information specific to intended subject matter of a conversation upon connection of said incoming call to said target telephonic device, such that content-specific information is acquired, including:
(a) electronically formatting said content-specific information for compatibility with a display capability of said target telephonic device,
(b) detecting a text message generated by a calling party at a calling telephonic device, said text message being indicative of said intended subject matter, and
(c) monitoring signals related to said incoming call to detect said text message containing said content-specific information, said text message being generated by said calling party prior to initiating said incoming call;

visually displaying said content-specific information using said display capability of said target telephonic device; and monitoring said target telephonic device for a signal to connect said incoming call to said target telephonic device.

* * * * *